United States Patent [19]

Gasser

[11] Patent Number: 5,505,754
[45] Date of Patent: Apr. 9, 1996

[54] AIR-FILTER DEVICE

[75] Inventor: Hermann Gasser, Frauenfeld, Switzerland

[73] Assignee: Galipag, Frauenfeld, Switzerland

[21] Appl. No.: 30,267

[22] Filed: Apr. 5, 1993

[30] Foreign Application Priority Data

Jun. 5, 1991 [CH] Switzerland ............................ 1673/91

[51] Int. Cl.[6] .................................................. B01D 29/66
[52] U.S. Cl. .................................... 55/294; 55/301; 95/280
[58] Field of Search ............................ 55/302, 303, 290, 55/301, 294; 95/279, 280

[56] References Cited

U.S. PATENT DOCUMENTS

| | | | |
|---|---|---|---|
| 2,474,478 | 6/1949 | Hart | 55/290 |
| 2,732,912 | 1/1956 | Young | 55/290 |
| 3,606,735 | 9/1971 | Baigas | 55/273 |
| 3,754,378 | 8/1973 | Christensen et al. | 55/290 X |
| 3,936,902 | 2/1976 | Shackleton et al. | 15/304 |
| 4,077,781 | 3/1978 | Sundstrom | 95/280 |
| 4,266,953 | 5/1981 | Matthys et al. | 55/302 X |
| 4,292,053 | 9/1981 | Remillieux | 55/302 X |
| 4,759,781 | 7/1988 | Olson | 55/302 X |
| 4,810,270 | 3/1989 | Terry et al. | 55/302 X |
| 4,812,149 | 3/1989 | Griffin et al. | 55/302 X |

FOREIGN PATENT DOCUMENTS

| | | |
|---|---|---|
| 0117065 | 8/1984 | European Pat. Off. . |
| 0378100 | 7/1990 | European Pat. Off. . |
| 2353328 | 12/1977 | France . |
| 2181669 | 4/1987 | United Kingdom . |

*Primary Examiner*—Richard L. Chiesa
*Attorney, Agent, or Firm*—Oblon, Spivak, McClelland, Maier & Neustadt

[57] ABSTRACT

An air-filter device has folded filters which form a plurality of filter regions. The device possesses at least one cleaning device for a filter region. On the crude-air side, the cleaning device has a mechanism which generates a transport flow, parallel to the folded filters and directed transversely to the air flow in the filter mode, and a disposal outlet for the material conveyed by the transport flow. On the clean-air side, the air-filter device possesses a comb nozzle which is movable along the filter region and which has a plurality of nozzles arranged in one plane and directed to the folded filter.

9 Claims, 9 Drawing Sheets

AIR-FILTER DEVICE

BACKGROUND OF THE INVENTION

Field of the Invention

The invention relates to an air-filter device having folded filters.

Folded filters, which are used for the precipitation of solid air impurities, have to be cleaned periodically to remove adhering filter residue. The cleaning takes place either by reverse flushing at a pressure corresponding approximately to the operation of the filter or by suction. The methods adopted hitherto for this and the appliances used are unsatisfactory from a technical point of view.

SUMMARY OF THE DRAWINGS

The object of the present invention is, therefore, to propose an air-filter device which not only has a good filter effect, but also avoids the disadvantages of the known cleaning devices.

DESCRIPTION OF THE PREFERRED EMBODIMENTS

Figure 1:
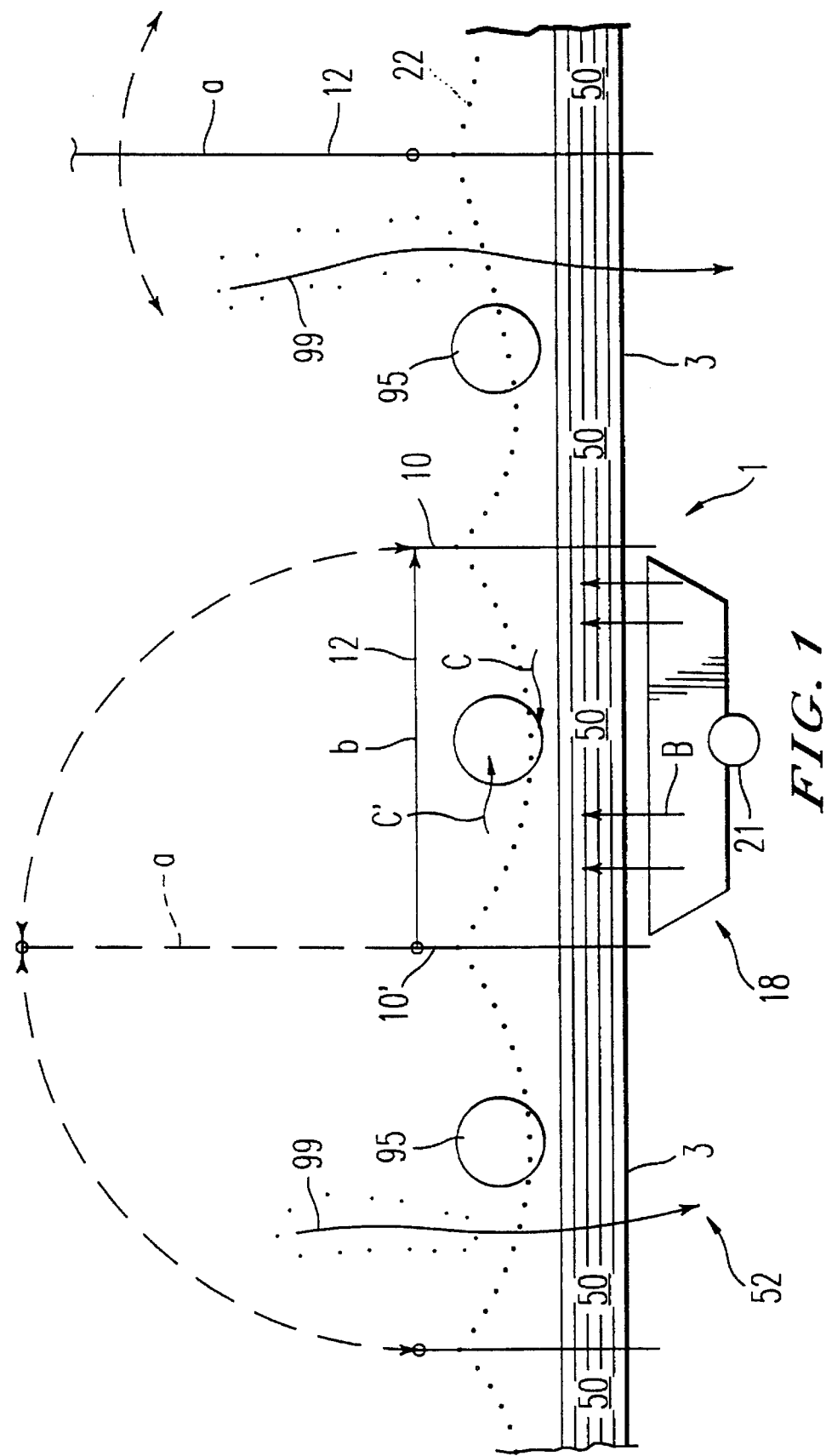

The design according to the invention of the air-filter device makes it possible to adapt the cleaning operation to each individual case. For example, the cleaning can be carried out, for a first relatively short operating time, only on the crude-air side with the transport flow and, only after a further longer operating time, simultaneously with the transport flow and on the clean-air side by loading with air from the comb nozzle.

Furthermore, the air-filter device according to the invention makes it possible, during the operation of the filter, to transfer a single filter region, that is to say only a small part of the air-filter device, from the filter state to the cleaning state, and vice versa. The individual cleaning of each filter region can thereby take place. In other words, within a filter device having a number of filter regions, a single filter region can be cleaned, while the operation of the filter is continued undisturbed with the remaining filter regions.

In the most economical and therefore simplest embodiment, the air-filter device according to the invention has only means for generating a transport flow which runs essentially parallel to the folded filters between the filter region and the delimiting member.

A more complex, but more effective cleaning is achieved if one or more nozzles movable along the filter region are provided on the clean-air side. Advantageously, the nozzle Jets form with the lamellae of the filter an acute angle which is changed during the movement of the nozzle. To improve the cleaning effect further, the folded filters can be loaded with a pulsating air stream.

The nozzles are preferably designed as Laval nozzles. To prevent a cooling of the outflowing air and therefore condensation of the air moisture, the nozzle expediently has a heating device.

A further optimization can be achieved by means of a steam supply, that is to say the arrangement of a steam feedline to the nozzle.

The outflow orifices of the individual air nozzles of the comb nozzles are arranged in a row in the manner of the teeth of a comb. The line formed by them, that is to say the plane of nozzle Jets, preferably forms an acute-angle with the folds of the folded filter. As a consequence of this arrangement, the folds of the folded filter are widened when blown against in the cleaning mode and are set in motion, with the result that the cleaning effect is accelerated or improved. The nozzles of the comb nozzle can be formed by recesses in a sealing material. Their production, which can be carried out, for example, by stamping the sealing material, is thereby substantially simpler and more economical, and the nozzle dimensions can be set merely by selecting the thickness of the sealing material, for example a sealing strip.

On the crude-air side, the individual filter regions can be preceded by a separation member for coarser impurities, for example filter cloth non-tensioned in the inoperative state or a screen. This is tensioned in the operating state, that is to say in the filter mode, and retains coarse solids, oil droplets or fibers and fly in the textile industry, etc. The quantity of residue on the folded filter is thereby reduced and the periods between cleaning operations are lengthened. Electrostatic separation aids of a known type can also be assigned to the filter units, thereby achieving a further improvement in the degree of separation.

In a preferred embodiment, the individual filter region is formed by a pair of folded filters which is arranged in a V-shaped manner and on the clean-air side is arranged a V-shaped comb nozzle movable in the longitudinal direction and having air nozzles over the filter width. At the same time, the filter region is assigned, on the crude-air side, a delimiting member having a shut-off member, for example a flap, movable out of an open position into a closed position.

A plurality of filter regions can be closed together to form a linear or concentric, for example circular or polygonal air-filter device, and where concentric structures are concerned a central ventilator can be used.

Either one cleaning device can be present for each filter region or a smaller number of cleaning devices can be present as filter regions. In the second case, either the filter regions and/or the cleaning device can be arranged movably.

In the air-filter device according to the invention, the individual filter regions can be cleaned without an interruption of operation, since the operation of the filter can be maintained with the other filter regions, without any appreciable reduction of the filter capacity.

BRIEF DESCRIPTION OF THE DRAWINGS

Figure 2:
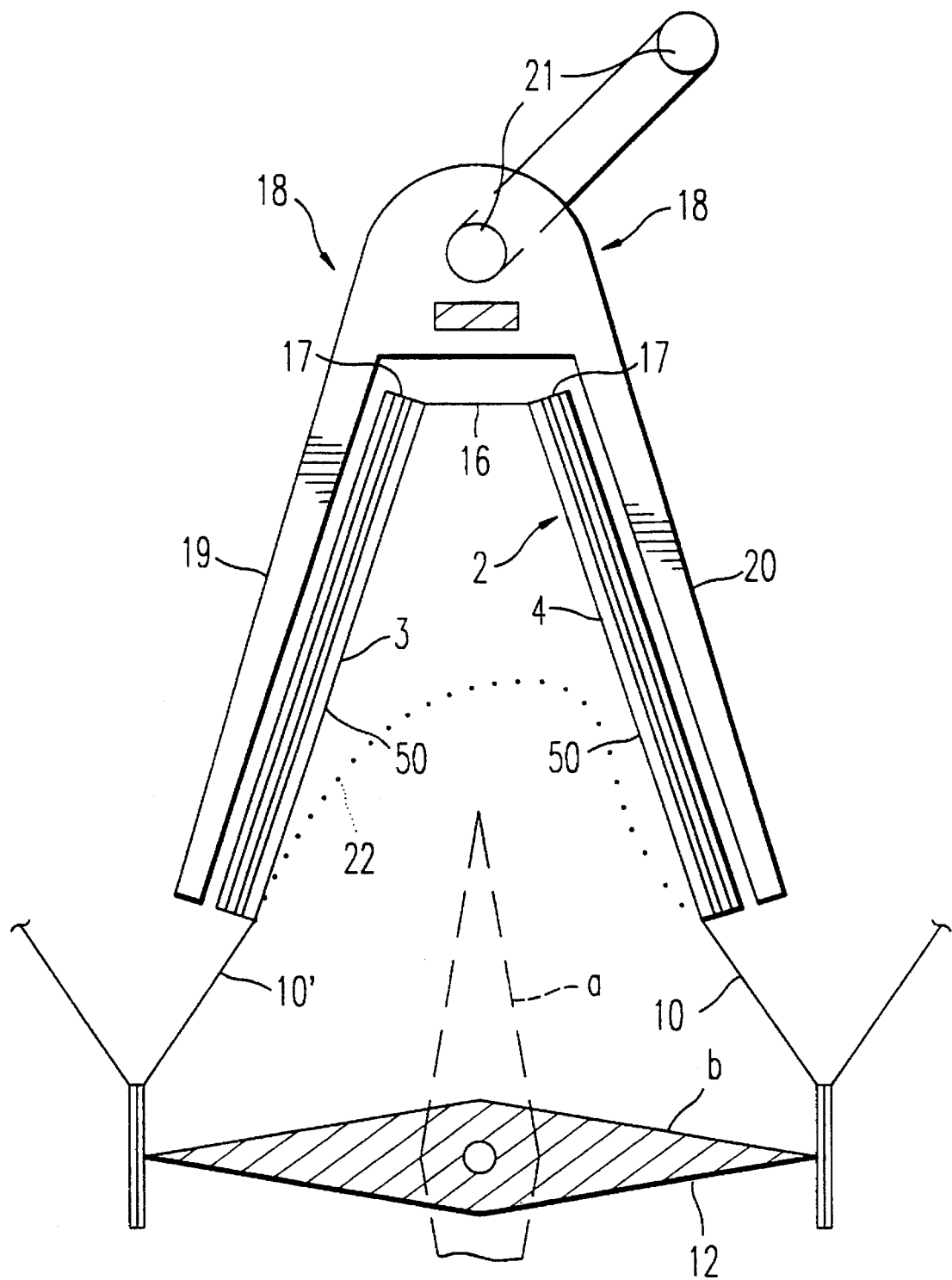
Figure 3:
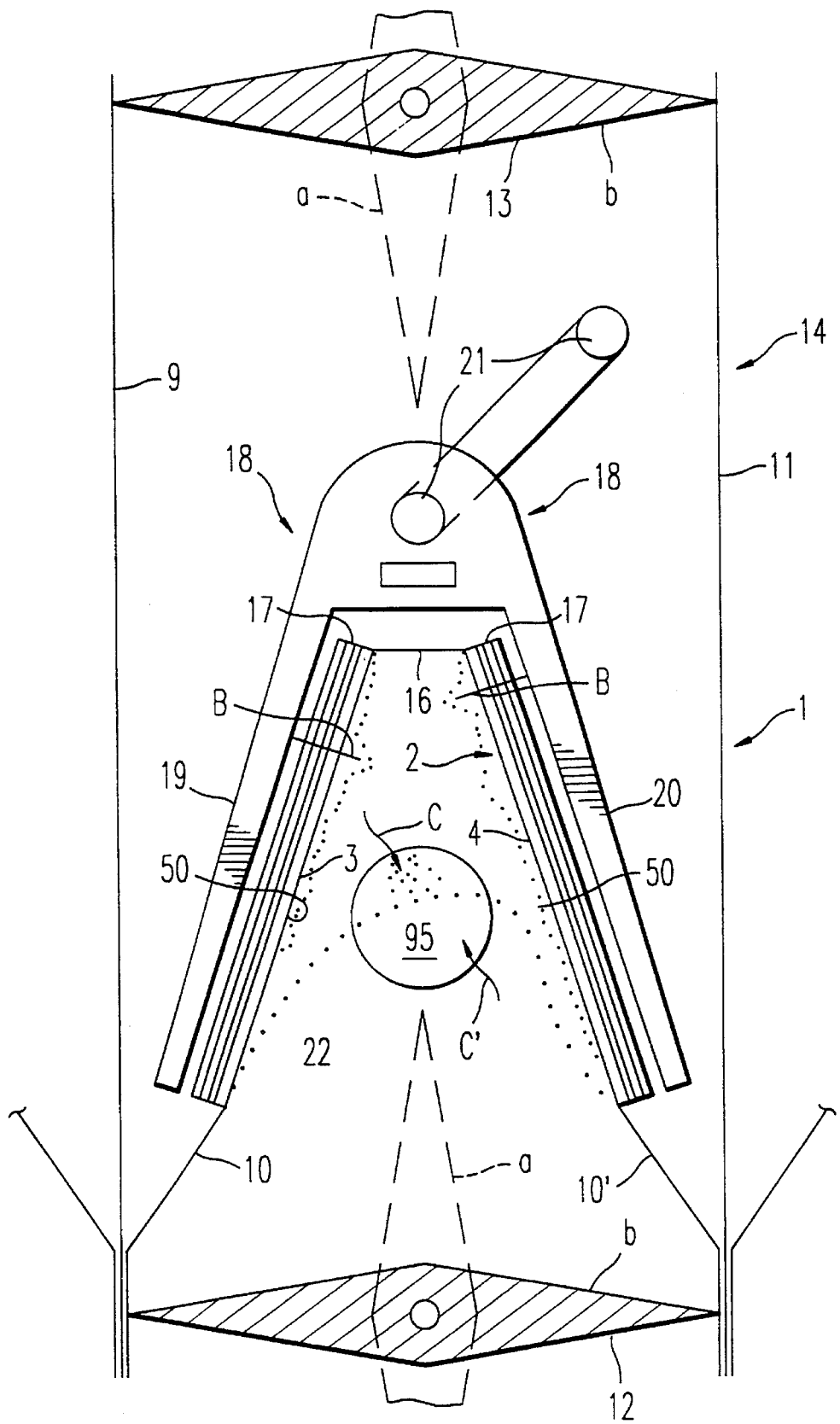
Figure 4:
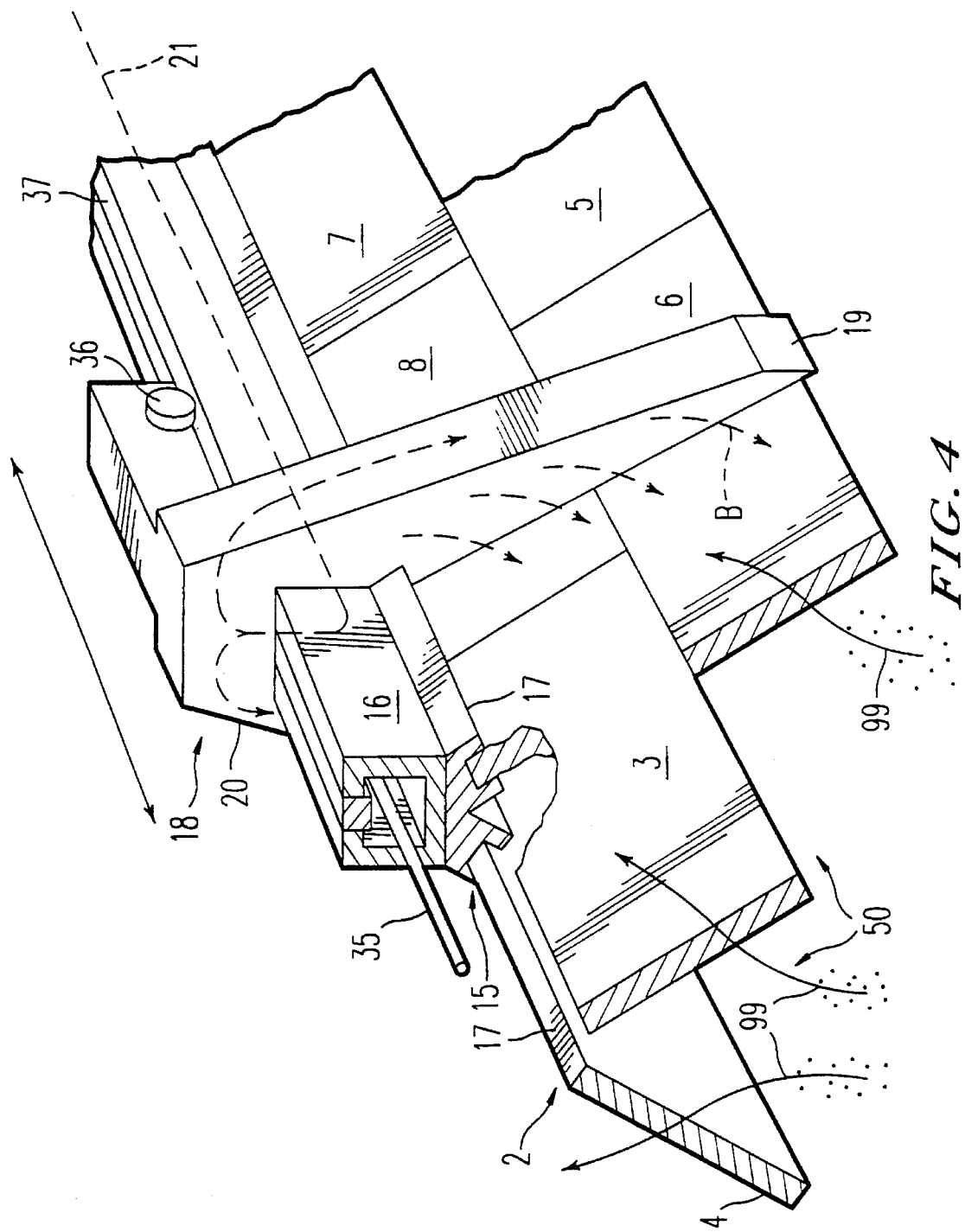
Figure 5:
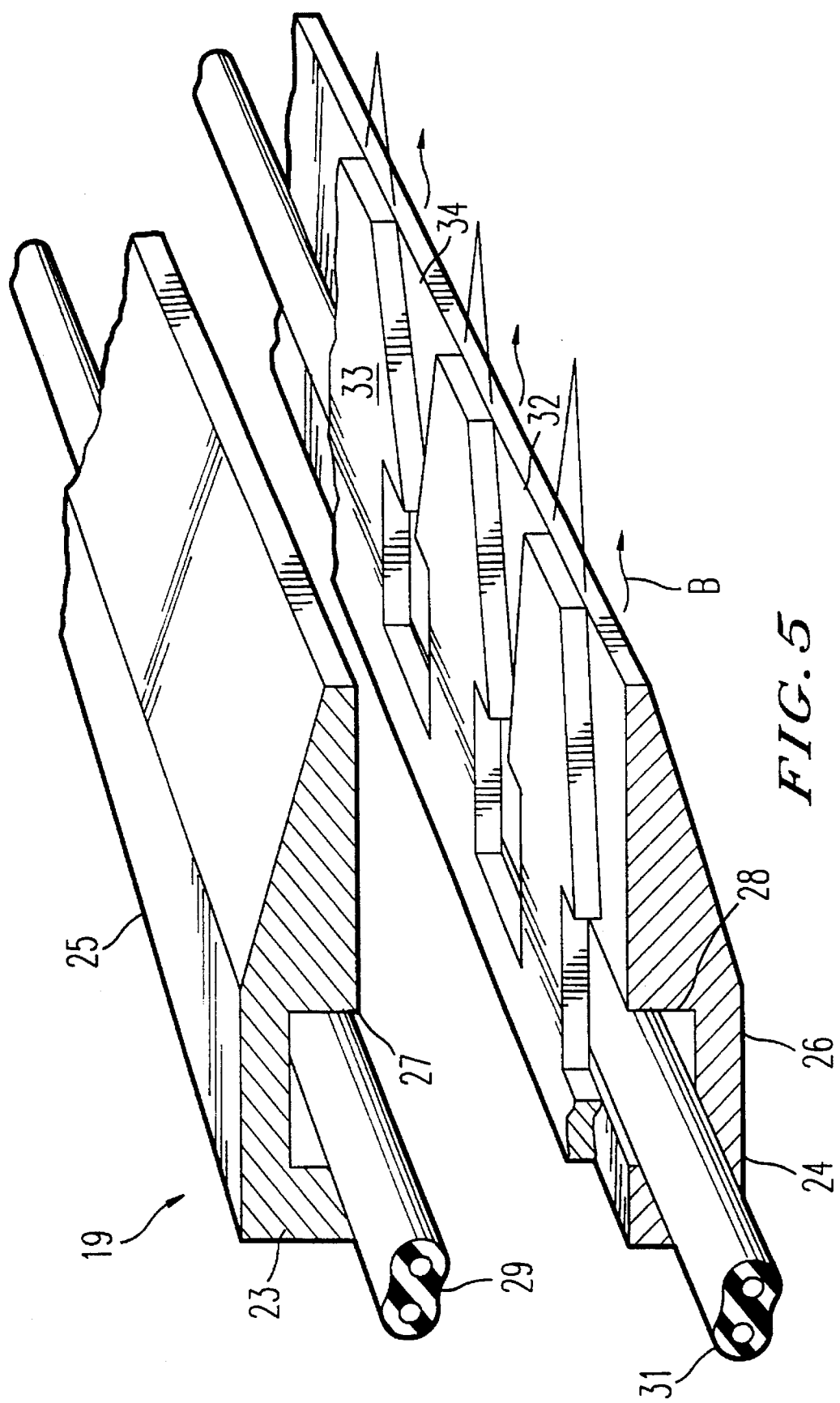
Figure 6:
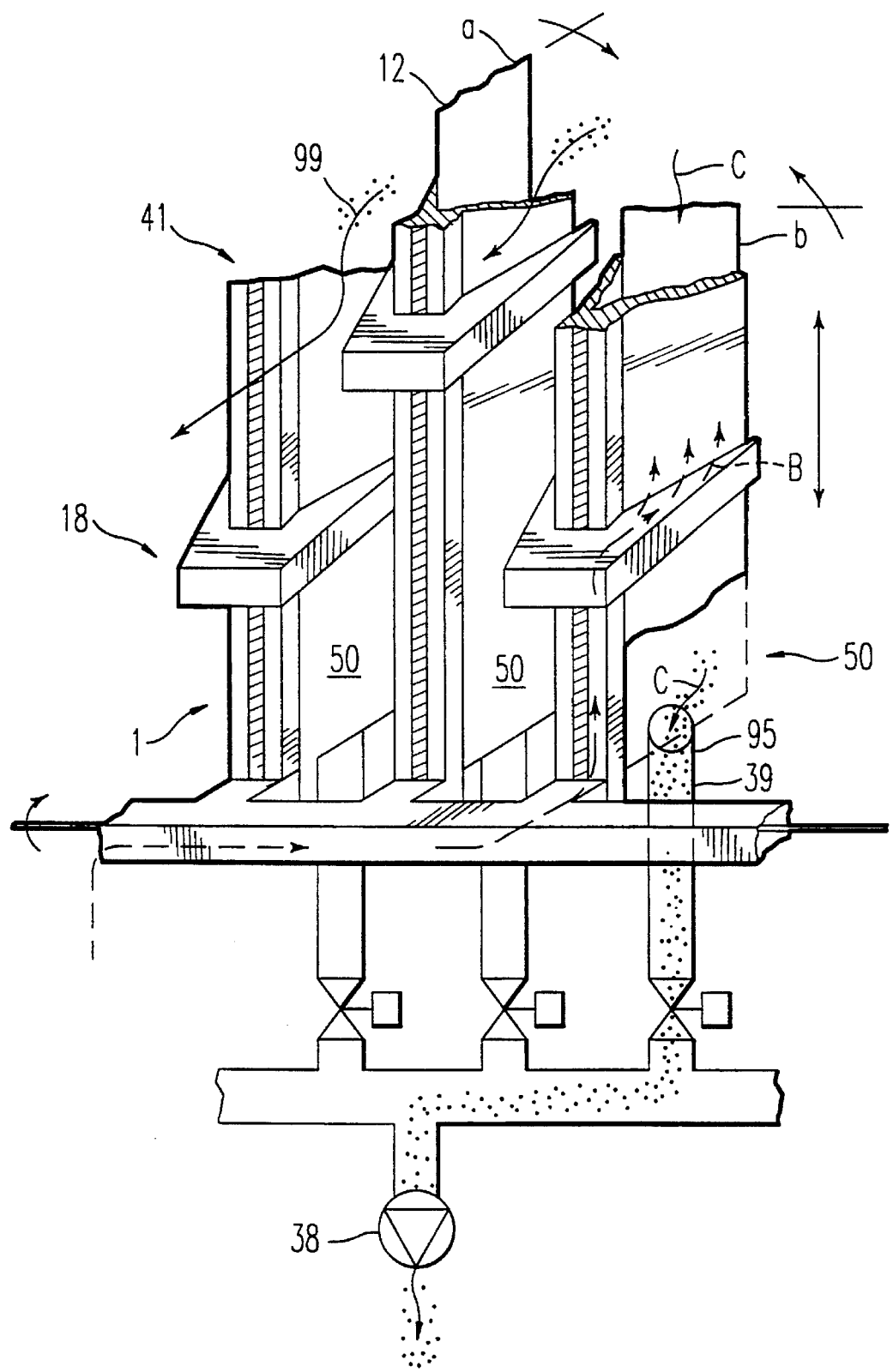
Figure 7A:
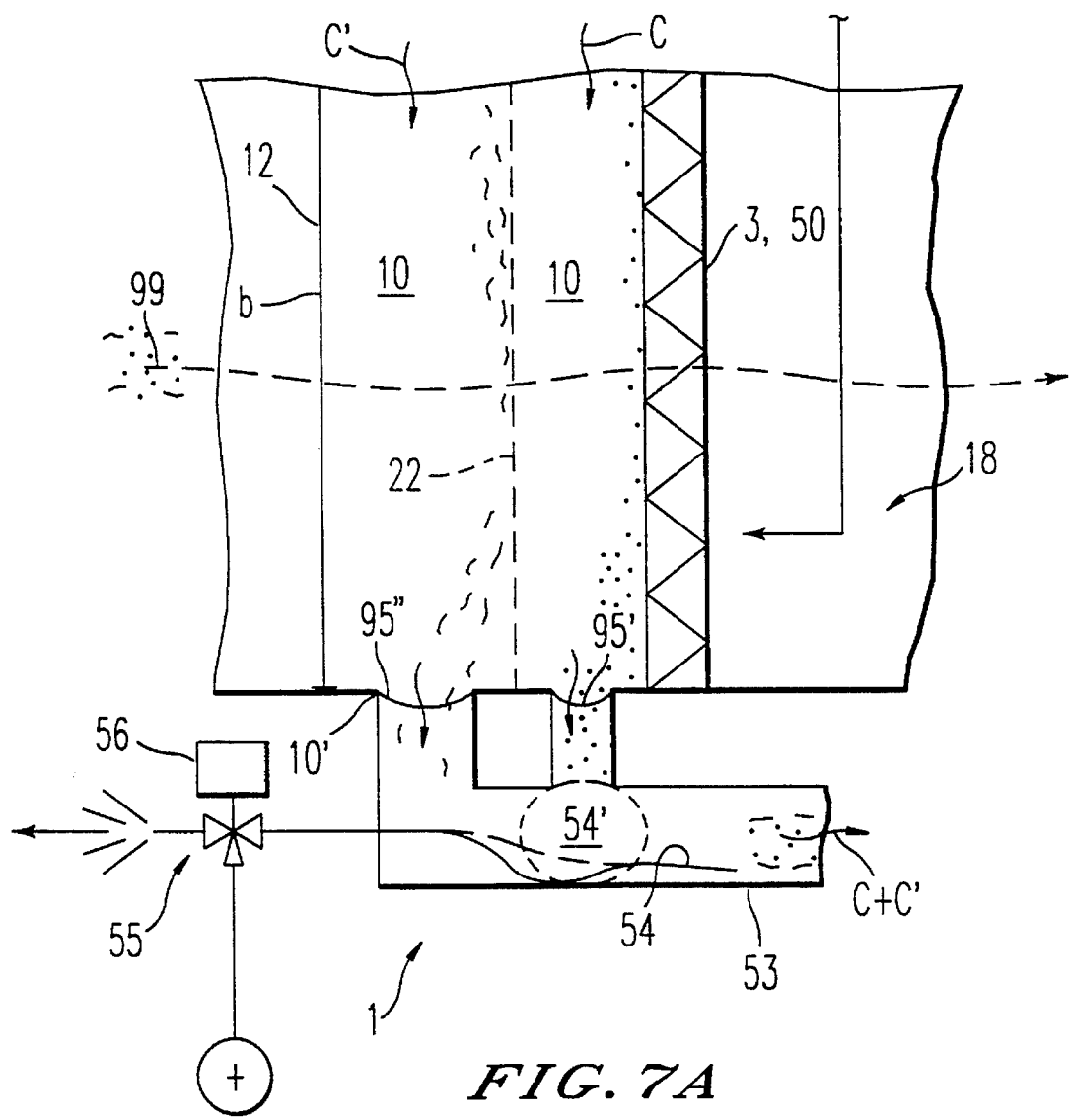
Figure 7B:
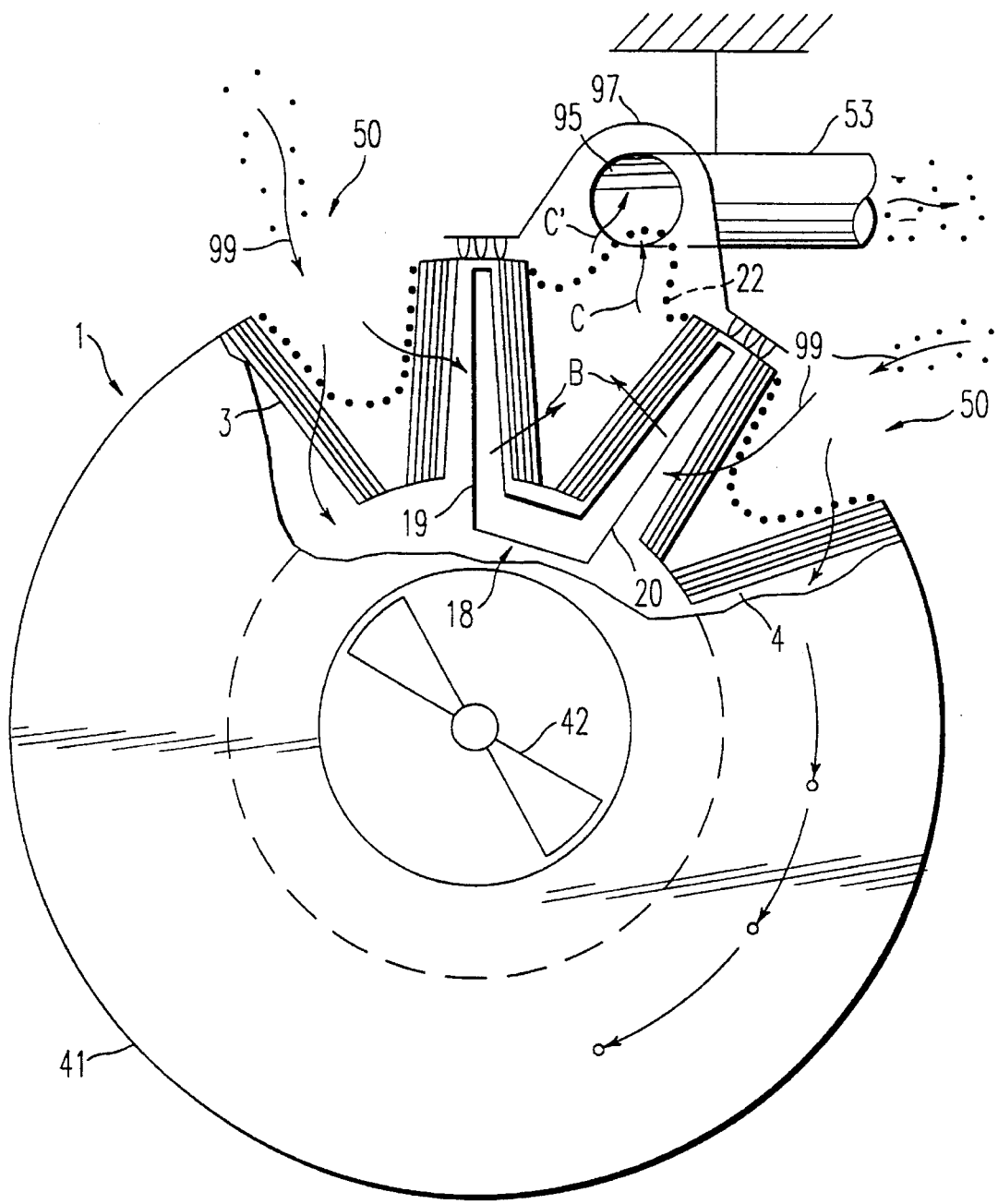
Figure 8:
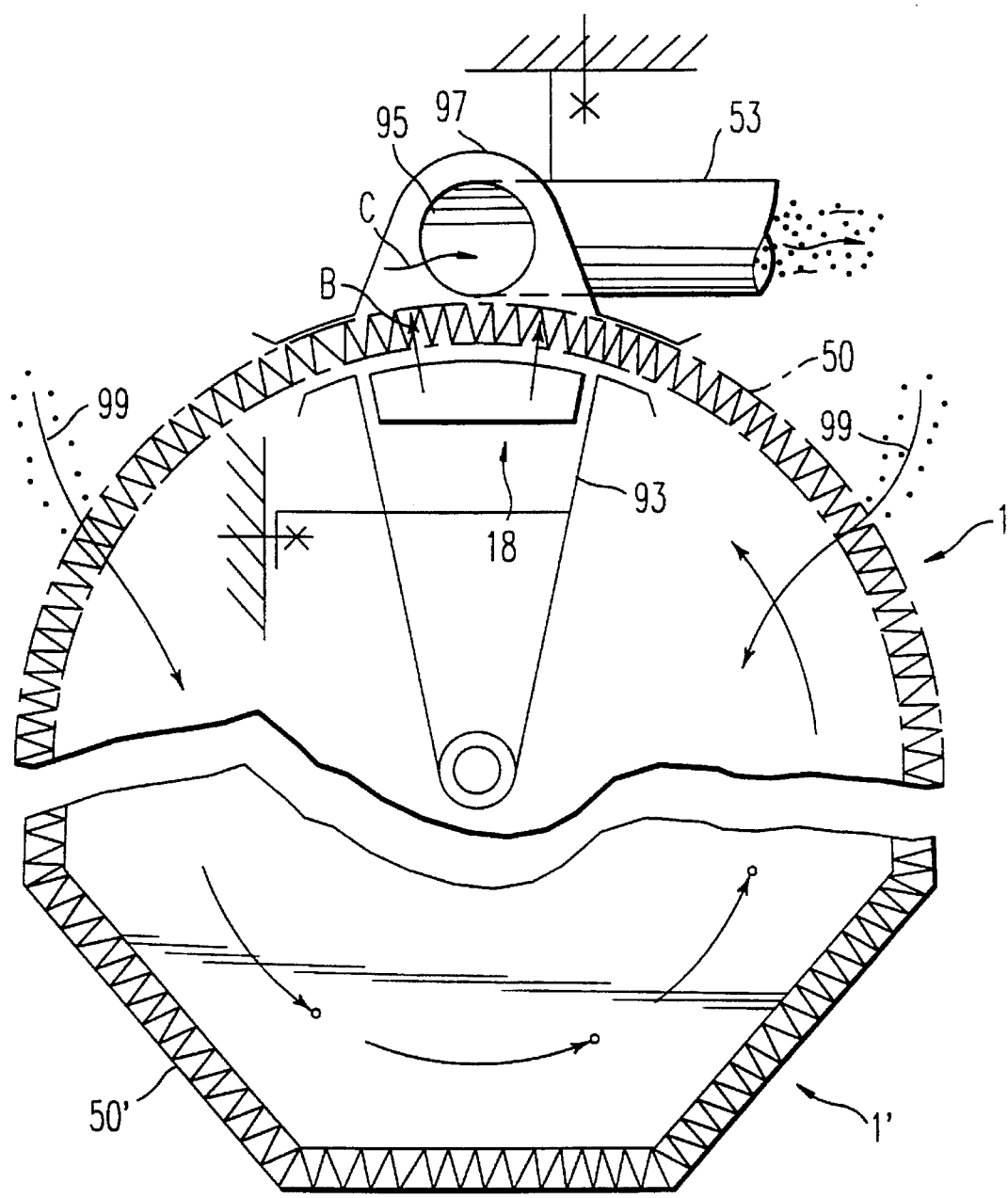

The invention is explained further by means of the figures. Of these purely diagrammatic figures:

FIG. 1 shows an air-filter device according to the invention;

FIG. 2 shows a filter region of a further air-filter device according to the invention;

FIG. 3 shows a filter region of a further air-filter device according to the invention;

FIG. 4 shows a perspective view of a filter region of a further air-filter device according to the invention;

FIG. 5 shows a perspective view of a comb nozzle in a partially sectional representation;

FIG. 6 shows a perspective view of a further air-filter device according to the invention having a plurality of filter regions;

FIG. 7A shows the lower part of a filter unit of the air-filter device according to FIG. 7B;

FIG. 7B shows a top view of a further air-filter device according to the invention having filter regions arranged in circular form;

FIG. 8 shows a top view of a further filter device according to the invention having filter regions arranged in circular form.

DESCRIPTION OF THE PREFERRED EMBODIMENTS

The air-filter device 1 in FIG. 1 has a number of folded filters 3 arranged in a rectilinear configuration. Each of these folded-filter elements 3 constitutes a filter region 50, the individual filter regions 50 are separated from one another by side walls 10, 10'. The side walls 10, 10' form, together with a flap 12 pivotable out of an open position a into a closed position b, a delimiting member for the airtight separation of the filter region 50 to be cleaned from the remaining filter regions. The direction of flow of the air in the filter mode is represented by an arrow 99. On the crude-air side, each filter region 50 is assigned a filter cloth 22, non-tensioned in the inoperative state, for trapping coarse particles, such as, for example, fibers, fibrils or the like or oil droplets, etc. Arranged above the drawing plane is an overpressure source (not shown) which, in the cleaning state, generates a transport flow C directed from above downwards. This transport flow is subdivided into two part streams C and C' by the filter cloth 22. In a lower part of the air-filter device, each filter region 50 is assigned a disposal orifice 95 for the disposal of the filter residue detached from the folded filters 3 and the filter cloth 22 and conveyed away by the transport flow. If desired, each of the two transport flows can be assigned a disposal orifice 95', 95" (FIG. 7a). On the clean-air side, the middle filter region 50 is assigned a comb nozzle 18 having an air line 21. The comb nozzle 18 is movable along the filter region 50 from above downwards or from below upwards. FIG. 1 shows the left and the right filter region 50 in the operating state, that is to say in the filter process, and the middle filter region in the cleaning state. In the latter, flap 12 is located in the closed position b. Transport flow C, C' is generated in the space formed thereby on the crude-air side and closed in an airtight manner. The filter region is simultaneously loaded with compressed air B from the comb nozzle 18 on the clean-air side. The pressure amounts to a multiple of the filtering pressure. After cleaning has ended, the flap 12 pivots into the open position a. The comb nozzle 18 is moved to the next filter region 50 to be cleaned, the flap of which pivots into the closed position b. The filter region 50 can also be cleaned solely by means of the transport flow C, C'.

In FIGS. 1 to 6, a filter region is formed by a pair of folded filters 2 arranged in a V-shaped manner. Each of the two folded filters 3, 4 of the pair of folded filters 2 consists of a plurality of filter elements 5, 6, 7, 8 (FIG. 4). Arranged after the ends of the folded filters 3, 4 on the crude-air side are side walls 10, 10' (FIGS. 2 and 3) which, together with the flap 12 pivotable out of an open position a into a closed position b, form a delimiting member for the airtight separation of the filter region to be cleaned. A longitudinal wall 9, 11 (FIG. 3) is arranged on each of the two sides of the pair of folded filters 2. On the clean-air side, a second flap 13 pivotable out of an open position a into a closed position b is arranged between the walls 9, 11. The longitudinal walls 9, 11 form, together with the flaps 12, 13, a closed cell 14, by which the pair of folded filters 2 is surrounded. The pointed end 15 of the V-shape of the pair of folded filters 2 is formed by a hollow rail 16, on the air-inflow outer face of which the longitudinal edges 17 of the folded filters 3, 4 are mounted. Arranged on the clean-air side of the hollow rail 16 is a comb nozzle 18 which is movable along the hollow rail 16 as a result of the cooperation of a gearwheel 36 and rack 37. The energy for the travelling mode can be supplied by an electric motor or an exhaust-air turbine. The comb nozzle 18 possesses two arms 19, 20 which are arranged in a V-shaped manner and which are at a short distance adjacent to the clean-air side of the pair of folded filters 2. An air line 21 is arranged in the hollow rail 16 and is connected to a compressed-air source. A filter cloth 22, non-tensioned in the inoperative state and tensioned in the operating state, for trapping coarser impurities is provided between the two filters 3, 4 of the pair of folded filters 2.

The arms 19, 20 of the comb nozzle 18 (FIG. 5) are formed by two rails 23, 24 which narrow towards the folded filters 3, 4 and in the non-narrowed part 25, 26 of which recesses 27, 28 for air guidance and for receiving heating lines 29, 31 are provided. If desired, steam lines can also be provided in these recesses 27, 28. A strip 33 of sealing material, provided with recesses 32, is arranged between the rails 23, 24. A respective recess 32 and the rails 23, 24 limit a Lavel nozzle 34. A plurality of Laval nozzles are arranged in a line next to one another, in such a way that their jets blow essentially without a gap against the adjacent folded filter. The comb nozzle 18 extends respectively over the entire width of the two folded filters 3, 4. The Laval nozzles 34 are preferably arranged in such a way that the line of nozzle jets B, that is to say the plane formed by them, forms an acute angle with the folds of the folded filters 3, 4.

A heating device 35 is arranged, in addition to the air line 21, within the hollow rail 16. The heating prevents the outflowing air from being cooled to too low a temperature, and in particular a cooling below the dew point is to be avoided.

As is evident from FIG. 6, a pressure sink 38, which is connected to the disposal orifice 95 via a collecting vessel 39, can be provided in order to generate the transport flow C, C'.

The air filter device 41 in FIG. 7B has a circular arrangement of V-shaped filter regions 50, with a ventilator 42 at the center. This circular arrangement can be designed as a drum which is mounted rotatably about its axis. The nozzle comb 18 and delimiting member 97 are at a fixed location, as indicated by wall ties in the Figure.

In the lower part of the filter regions 50 of FIG. 7B (shown in FIG. 7A), a disposal orifice 95', 95" is provided for each of the two transport flows C, C'. Arranged in the disposal channel 53 adjoining the disposal orifices 95', 95" is an inflatable closing member 54, the air content of which is controlled by means of a control device 56 via a three-way cock. In the inflated state 54', the closing member 54 shuts off the disposal channel 53 in an airtight manner. Furthermore, in FIG. 7A, a screen 22' is arranged instead of the filter cloth 22.

FIG. 8 illustrates two versions of an air-filter device 1, 1' having circular-segmental and rectilinear filter regions 50, 50' respectively. In the first case, the filter device is cylindrical, and in the second case it is polygonal. In addition to the delimiting member on the crude-air side, a delimiting member 93 is also provided here on the clean-air side. Here too, the air-filter device 1, 1' is rotatable. The comb nozzle 18 and the delimiting members 93, 97 are arranged at a fixed location.

I claim:

1. An air filter device comprising:

folded filters and a plurality of filter regions;

at least one cleaning device, on a crude air side, of a filter region to be cleaned of said plurality of filter regions, the cleaning device having a delimiting member for an airtight separation of the filter region to be cleaned from the remaining filter regions, and means for generating a transport flow between the filter region to be cleaned and the delimiting member, said transport flow being substantially parallel to the folded filters and being directed transversely to an air flow in a filter mode, said delimiting member having a shut-off member movable out of an open position into a closed position, said delimiting member comprising side walls and said shut-off member comprising a pivotable flap positioned within the delimiting member between the side walls; and a disposal outlet, for material moved by the transport flow.

2. The air-filter device as claimed in claim 1, further comprising a nozzle on a clean-air side which is movable along the filter region.

3. The air-filter device as claimed in claim 2, wherein the nozzle is a comb nozzle (18) which comprises a plurality of nozzles arranged in one plane and directed to the folded filter.

4. The air-filter device as claimed in claim 3, wherein the comb nozzle is a Laval nozzle.

5. The air-filter device as claimed in claim 4, wherein the comb nozzle comprises a heating device.

6. The air-filter device as claimed in claim 3, wherein the nozzles of the comb nozzle are formed by recesses in a strip of sealing material.

7. The air-filter device as claimed in claim 2, wherein the nozzle comprises nozzle jets and a plane of the nozzle jets forms an acute angle with folds of the folded filter to be cleaned.

8. The air-filter device as claimed in claim 7, wherein the filter region is preceded on the crude-air side by a separation member for coarser impurities.

9. The air-filter device as claimed in claim 1, wherein the filter region is formed by a pair of said folded filters which are arranged in a V-shaped manner and on a clean-air side of which is arranged a V-shaped comb nozzle movable in a longitudinal direction and having air nozzles over a width of the filter region.

* * * * *

UNITED STATES PATENT AND TRADEMARK OFFICE
CERTIFICATE OF CORRECTION

PATENT NO. : 5,505,754
DATED : April 9, 1996
INVENTOR(S) : Hermann GASSER

It is certified that error appears in the above-indentified patent and that said Letters Patent is hereby corrected as shown below:

On the title page, in Item [22], the PCT Information is missing. It should read:

--[22] PCT Filed: June 3, 1992--

Items [86] and [87], also PCT Information, are missing. They should read:

--[86] PCT No.: PCT/CH92/00106
§371 Date: Apr. 5, 1993
§102 Date: Apr. 5, 1993

[87] PCT Pub. No: WO92/21428
PCT Pub. Date: Dec. 10, 1992--

Signed and Sealed this

Fifth Day of November, 1996

*Attest:*

BRUCE LEHMAN

*Attesting Officer*   *Commissioner of Patents and Trademarks*